United States Patent [19]

Aoshima

[11] 4,234,783
[45] Nov. 18, 1980

[54] ELECTRIC RICE COOKERS

[75] Inventor: Terutaka Aoshima, Toyohashi, Japan

[73] Assignee: Tokyo Shibaura Denki Kabushiki Kaisha, Kawasaki, Japan

[21] Appl. No.: 47,240

[22] Filed: Jun. 11, 1979

[30] Foreign Application Priority Data

Jun. 16, 1978 [JP] Japan .................................. 53-73656
Jun. 16, 1978 [JP] Japan .................................. 53-73657

[51] Int. Cl.³ .......................................... F27D 11/02
[52] U.S. Cl. .................................. 219/441; 99/332; 219/432; 219/433; 219/438; 219/442
[58] Field of Search ............... 219/385, 386, 430, 432, 219/433, 438, 439, 441, 442; 99/285, 331, 332, 333, 335

[56] References Cited

U.S. PATENT DOCUMENTS

| | | | |
|---|---|---|---|
| 2,431,582 | 11/1947 | Page | 219/442 |
| 2,785,277 | 3/1957 | Jepson | 219/442 |
| 2,889,443 | 6/1959 | Dobmeier | 219/433 X |
| 3,644,709 | 2/1972 | Hojo | 219/439 |
| 3,764,780 | 10/1973 | Ellis | 219/441 X |
| 3,818,180 | 6/1974 | Arosio | 219/441 X |
| 3,908,111 | 9/1975 | DuBois et al. | 219/442 |
| 4,063,068 | 12/1977 | Johnson et al. | 219/441 |

*Primary Examiner*—Volodymyr Y. Mayewsky
*Attorney, Agent, or Firm*—Cushman, Darby & Cushman

[57] ABSTRACT

In an electric rice cooker, an electric heater for heating a kettle containing a quantity of rice and water is firstly energized through a first contact of a switch sensitive to the temperature of the kettle. When cooking operation completes the switch transfers to a second contact to start a timer. After a predetermined time, the timer reenergizes the heater through the second contact for a definite interval.

5 Claims, 6 Drawing Figures

ELECTRIC RICE COOKERS

This invention relates to an electric rice cooker capable of cooking twice.

In the operation of an electric rice cooker it is well known that boiled rice of excellent taste can be obtained by interrupting an electric heater by a temperature sensitive switch when the rice has been cooked and then reenergizing the electric heater for a short interval a predetermined time after the first interruption of the heater.

According to the prior art construction, however, the energization and the deenergization of the electric heater at the second cooking time is effected manually and the interval of second energization is determined by experience and feeling of the user so that stable and reliable twice cooking have been difficult.

In a rice cooker provided with a ripenning heater, the user often makes an error in setting the ripenning heater without firstly setting a main cooking heater, thus producing half-boiled rice. However, use of two heaters increases the cost of the cooker. Especially, in a twice cooking type rice cooker, it is necessary to constantly watch the progress of cooking.

Accordingly, it is an object of this invention to provide a full automatic electric rice cooker which uses a single cooking heater and can energize and deenergize it most suitable to produce delicious boiled rice and can prevent energization of the heater for ripening without firstly energizing it for cooking.

Another object of this invention is to provide an electric rice cooker capable of preventing from production of half-boiled rice even when a heater is inadvertently set for ripening without firstly using it as a cooking heater.

According to this invention, there is provided an electric rice cooker comprising a kettle adapted to contain a quantity of rice and water, an electric heater for heating the kettle, a temperature sensitive switch disposed to sense temperature of the kettle and having first and second contacts, the temperature sensitive switch energizing the electric heater through the first contact at the time of starting cooking operation, but transferring to the second contact in response to a cooking completion temperature, and a timer energized through the second contact for reenergizing the heater for a definite interval a predetermined time after energization of the timer.

Figure 1:
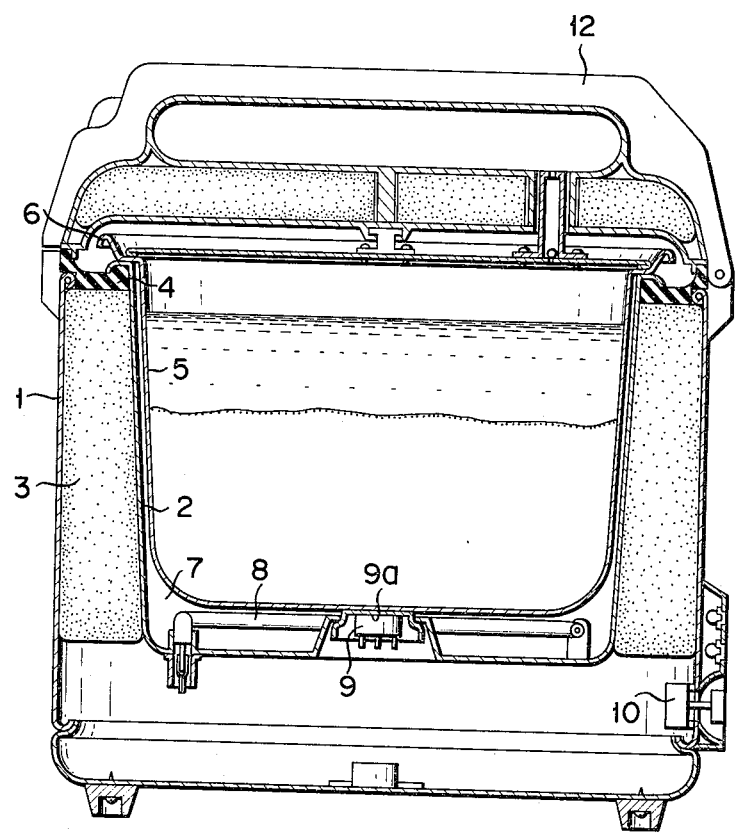
FIG. 1 is a longitudinal sectional view showing a first embodiment of an electric rice cooker embodying the invention.
Figure 2:
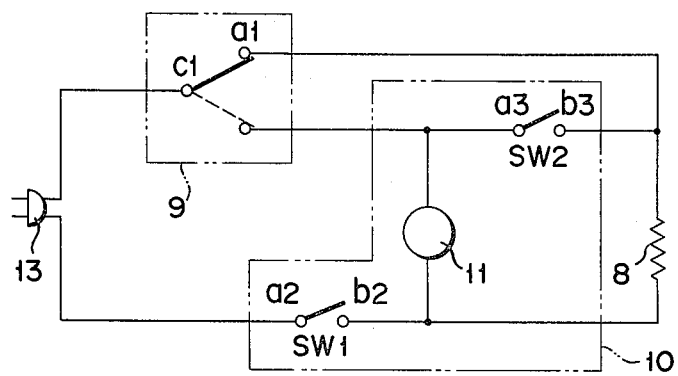
FIG. 2 is an electric connection diagram of the first embodiment.
Figure 3:
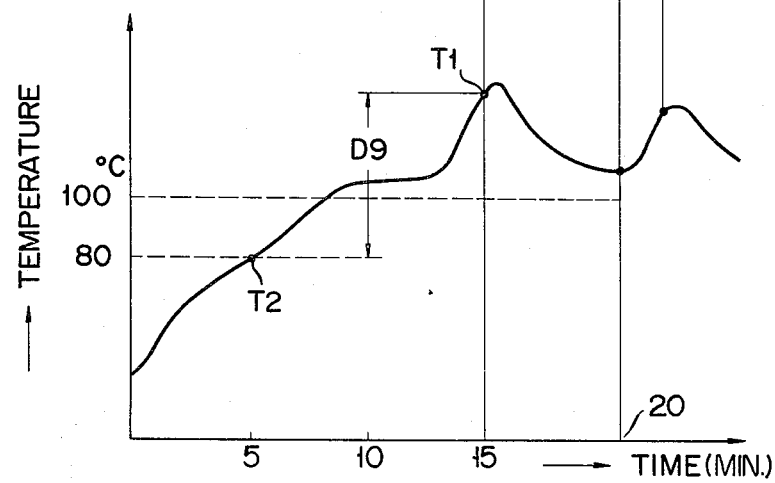
FIG. 3 is a graph useful to explain the cooking step of the first embodiment.

Referring now to FIG. 1, a first embodiment of this invention shown therein utilizes at a cooking kettle of the radiation heating type and comprises a bottomed outer cylindrical frame 1, an inner cylindrical frame 2 and a heat insulating layer 3 interposed between the inner and outer frames. The inner frame 2 is made of such high heat conductivity material as aluminum and its surface is polished as by chemical polishing for the purpose of improving heat reflection. The inner frame 2 is formed as a bottomed cylindrical body and its upper end is connected to an ornamental ring 4. A cooking kettle 5 is removably contained in the inner frame 2 with a predetermined gap between the inner bottom of the inner frame 2 and the bottom of the cooking kettle 5. The kettle 5 is provided with an outwardly extending flange 6 at its upper end so as to be supported by the inner frame 2 through the flange 6. When the kettle 5 is disposed in the inner frame 2 in a manner as above described, a suitable space or gap 7 is formed between the outer surface of the bottom of the kettle 5 and the inner bottom of the inner frame 2 and an electric heater 8 is mounted in the gap at suitable distances from the kettle 5 and the inner frame 2. The central portion of the bottom of the inner frame 2 projects into the space 7 and its lower opening is closed by a heat conducting plate 9a. A temperature sensitive switch 9 is mounted on the lower surface of the heat conductive plate 9a. The heat conductive plate 9a is in contact with the outer bottom surfaces of the kettle 5 so that the temperature sensitive switch 9 senses the temperature of the bottom of the kettle 5. As shown in FIGS. 2 and 3, the switch 9, transfers from a first closed position to a second closed position at a temperature $T_1$ at which the cooking of the rice is completed whereas the switch 9 automatically transfers from the second closed position to the first closed position at a temperature $T_2$ which is slightly lower than a ripenning temperature. Thus, the switch 9 has a reversible differential characteristic. The space between the bottom of the inner frame 2 and the outer frame 1 is not provided with the heat insulating layer 3 and a timer 10 is mounted on the lower inner surface of the outer frame 1 to project into the space. The timer 10 contains a timer motor 11 shown in FIG. 2. The rice cooker is provided with a removable lid 12.

The electric circuit of the rice cooker is shown in FIG. 2. Thus, one terminal of a source plug 13 is connected to a movable contact $c_1$ of the temperature sensitive switch 9 which also includes first and second stationary contacts $a_1$ and $b_1$ at the first and second closed positions respectively. The first stationary contact $a_1$ is connected to the other terminal of the source plug 13 via a electric heater 8 and contacts $a_2$, $b_2$ of a first switch $SW_1$ of the timer 10. The second stationary contact $b_1$ of the temperature sensitive switch 9 is connected to the juncture between the first stationary contact $a_1$ and the heater 8 through the contacts $a_3$, $b_3$ of a second switch $SW_2$ of the timer 10. One end of the timer motor 11 is connected to the second stationary contact $b_1$ whereas the other end is connected to contact $b_2$ of the first switch $SW_1$.

The operation of this invention will now be described with reference to FIGS. 1 through 3. In FIG. 3 shaded portions show closed state of switches at first, a predetermined quantity of rice and a quantity of water corresponding to the quantity of rice are put into the kettle 5. After loading the kettle 5 in the inner frame 2, the lid 12 is closed. Then at time $t_{a0}$ the timer 10 is set to close the first switch $SW_1$. At this time, since the temperature of the kettle 5 is low, the movable contact $c_1$ of the temperature sensitive switch 9 engages stationary contact $a_1$. Accordingly the main cooking circuit is closed to energized the heater 8 so as to start the rice boiling operation. While water is still remaining in the kettle 5, the temperature at the bottom of the kettle 5 is maintained at about 100° C. However, as the ripening temperature is higher than 100° C., the temperature sensitive switch 9 is maintained in contact with the first stationary contact. When the water evaporates off the temperature of the bottom of the kettle rises quickly. Since the heat conductive plate 9a is heated by heat radiated from the heater 8 and passing through the central projection at the bottom of the inner frame 2, its temperature rises from a temperature slightly higher than that of the bottom of the kettle and in proportion thereto as shown by FIG. 3. At time $t_{a1}$, the temperature of the heat conductive plate 9a reaches the cooking completion temperature $T_1$ due to the evaporation of the water, so that the movable contact $c_1$ of the temperature sensitive switch 9 transfers to stationary contact $b_1$ thus deenergizing the heater 8. At the same time, the motor 11 of the timer 10 is started. Under this condition, since the second switch $SW_2$ is open, the heater would not be energized thus ripenning the boiled rice. When a time period from $t_{a1}$ to $t_{a2}$ set by the timer 10 has lapsed (in this case, 5 minutes have lapsed), the timer motor 11 closes the second switch SW2 whereby the heater 8 is energized again to cook twice. At the time $T_{a2}$ the temperature of the boiled rice should be maintained at least more than 98° C. When the reenergization time has lapsed and reached to time $t_{a3}$, the first switch $SW_1$ is brought to an open state and all the cooking process will be completed set in this manner elases at time $t_{a3}$, the first switch $SW_1$ is opened thus completing one cooking cycle. The reset temperature at which the temperature sensitive switch 9 transfers from contact $b_1$ to contact $a_1$ is set to a temperature which is considerably lower than the temperature of the bottom of the kettle 5 during ripening, so that the switch 9 does not return to the first stationary contact during ripenning. The reset temperature $T_2$ is set to 80° C., for example, so that when the temperature of the bottom of the kettle 5 decreases below 80° C. after completion of the second cooking step, the movable contacts, engages the stationary contact $a_1$. However, at this time since the timer 10 has reset, the heater 8 would not be energized.

In the foregoing embodiment, the rice cooking operation including a second cooking step is controlled by a temperature sensitive switch which operates reversibly in response sensitive switch which operates reversibly in response to the temperature of the kettle and a timer which is operated by the temperature sensitive switch when rice has cooked. Accordingly, the time of starting the second cooking step and duration thereof are maintained always constant thus producing cooked rice having constant quality which cannot be obtained by a prior art electric rice cooker in which the second cooking step is effected manually by relying upon the feeling of the user. Moreover, since the temperature sensitive switch automatically reverses its switching the cooking operation can be executed by merely operating the timer. Even when the cooker is connected to a source without setting the timer, the operation is commenced from the first cooking step instead of the second cooking step whereby half boiling can be prevented.

Figure 4:
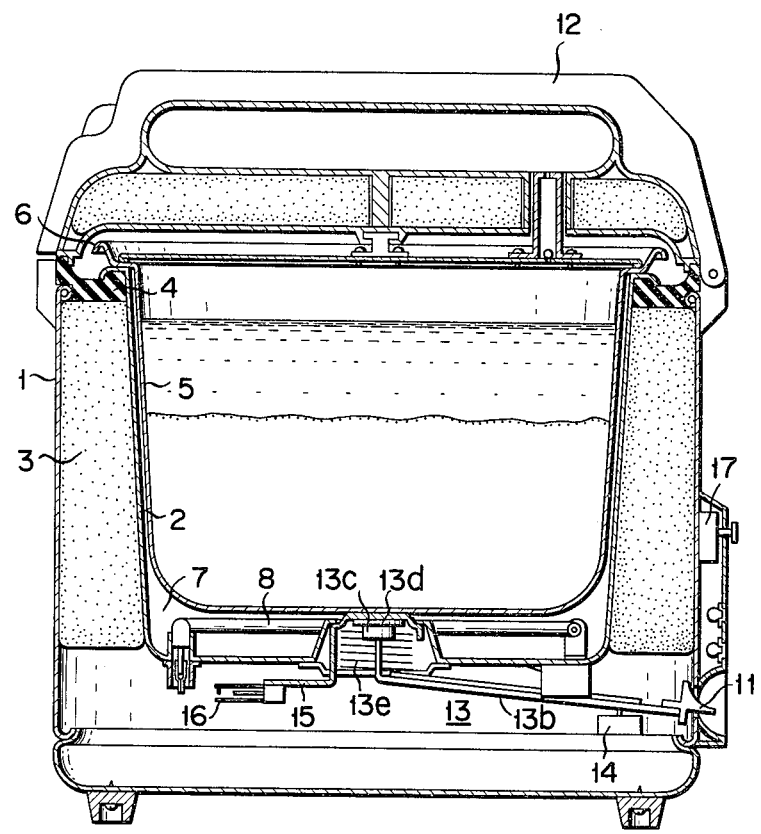
FIG. 4 is a longitudinal sectional view showing a second embodiment of this invention.

The second embodiment of this embodiment will now be described with reference to FIGS. 4, 5 and 6. In this embodiment a space is formed between the inner bottom of the outer frame 1 and the bottom of the inner frame 2 and a main temperature sensitive switch 13 is provided on the lower side wall of the outer frame, with its operating member 13a projected to the outside. The operating member 13a is connected to a holding member 13c through a lever 13b. For example, the holding member 13c comprises a permanent magnet. When the switch 13 is manually closed, the permanent magnet 13c is attracted, against the force of a coil spring 13e, to a magnetic member 13d which loses its magnetic property at the magnetic transition point thus rapidly decreasing its permeability at a predetermined temperature $T_1$ higher than 100° C. Thus, the temperature responsive switch 13 is constructed such that the magnetic attractive force between the holding member 13c and the magnetic member 13d disappears at the predetermined temperature $T_1$ so that a microswitch 14 is transferred from a first closed position to a second closed position. One end of a heat conductive plate 15 in contact with the bottom surface of the kettle 5 is disposed close to the bottom of the inner frame 2 and the free end of the plate 15 extends beneath the bottom of the inner frame 2. An automatic temperature adjuster 16 acting as an auxiliary temperature responsive switch is secured to the free end by screws. The automatic temperature adjuster 16 opens at normal temperature but closes at a predetermined temperature, for example 80° C., which is lower than the cooking completion temperature. A timer 17 is mounted on the inner surface of the outer frame 1, the timer containing a timer motor 18 (see FIG. 5). The timer is manually set with the length of the second cooking time.

Figure 5:
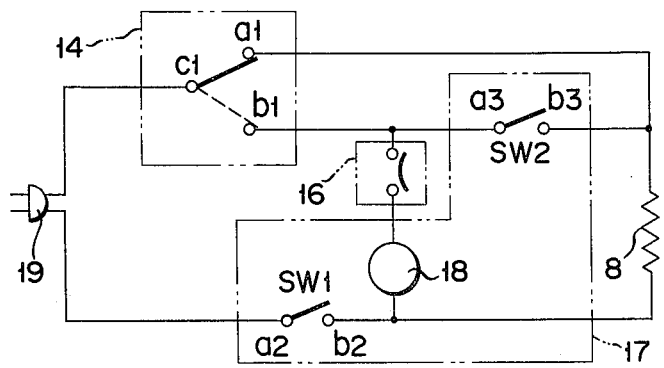
FIG. 5 is an electrical connection diagram of the second embodiment.
Figure 6:
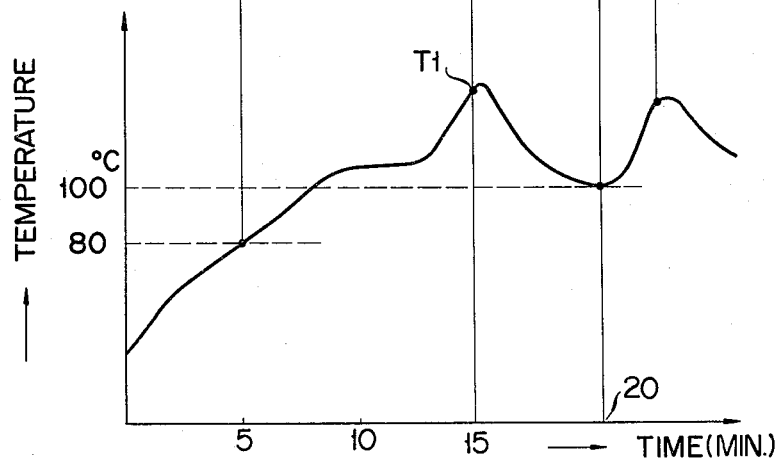
FIG. 6 is a graph useful to explain the cooking step of the second embodiment.

The electric circuit of this modification is shown in FIG. 5. Thus, one terminal of a plug 19 is connected to the movable contact $c_1$ of the microswitch 14 contained in the temperature sensitive switch 13. The microswitch 14 has a first stationary contact $a_1$ at a first closed position and a stationary contact $b_1$ at a second closed position, and can be set to either one of these positions by the operation of the operating member 13a shown in FIG. 4. The stationary contact $a_1$ is connected to the other terminal of the plug 19 through electric heater 8 and the contacts $a_2$, $b_2$ of a cam switch $SW_1$ of the timer 17. One contact $b_3$ is connected to the juncture between the heater 8 and the stationary contact $a_1$ whereas the other contact $a_3$ is connected to the stationary contact $b_1$ of microswitch 14. One contact $b_2$ of the cam switch $SW_1$ of timer 17 is connected to one terminal of the timer motor 18, while the other terminal of the timer motor 18 is connected to the stationary contact $b_1$ of the microswitch 14 via the automatic temperature adjuster 16.

The operation of the second embodiment will be described in the following with reference to FIGS. 4, 5 and 6. The shaded portions in FIG. 6 represents the closed states of the switches. The kettle charged with a predetermined quantity of rice and water of a quantity proportional to the quantity of rice is disposed in the inner frame 2 and then the lid 12 is closed. The operating member 13a is pushed down to close the stationary contact $a_1$ of the microswitch 14 of the heat sensitive switch 13. At the same time, the timer 17 is set to close the cam switch $SW_1$. As a consequence, the heater 8 is energized to start cooking. When the temperature of the kettle 5 exeeds 80° C., the automatic temperature adjuster 16 is closed, and when the temperature reaches 100° C. the water begins to boil. While water is still remaining in the kettle 5, the temperature of the bottom of the kettle is maintained at about 100° C. whereas when the water evaporates off, the bottom temperature rises quickly. Since the magnetic member 13d of the heat responsive switch 13 and the heat conductive plate 15 is heated by the heat radiated from the bottom of the kettle, the temperature of the magnetic member 13d and the heat conductive plate 15 rises from a temperature slightly higher than the temperature of the kettle bottom as shown in FIG. 6. When the temperature of the kettle bottom rises quickly as a result of evaporation of water, the temperature of the magnetic member 13d and the heat conductive plate 15 also rises quickly. When the temperature of the magnetic member 13d reaches the predetermined temperature $T_1$ at time $t_{a1}$ shown in FIG. 6, the permeability of the magnetic member 13d decreases greatly whereby the holding member 13c is moved downwardly by the force of the coil spring 13e to transfer the movable contact $c_1$ of the microswitch 14 from the stationary contact $a_1$ to the stationary contact $b_1$. Concurrently therewith the operating member 13a returns to the upper position thus deenergizing the heater 8.

Since the automatic temperature adjuster 16 has been closed at about 80° C., the timer motor 18 would be energized. Under this state, since contacts $a_3$ and $b_3$ of the cam switch $SW_2$ are opened, the heater 8 would not be energized thus executing the ripening step. When a time set by the timer 17 elapses at time $t_{a2}$ shown in FIG. 6 (in this case 5 minutes) the timer motor 18 closes the cam switch $SW_2$ whereby the heater 8 is energized again. At this time $t_{a2}$, the temperature of the boiled rise should be maintained at least more than 98° C. After a predetermined time preset by the timer, the cam switch $SW_1$ is opened at time $t_{a3}$ thus completing one cycle of rice cooking.

During the ripening step, since the temperature of the kettle 5 is considerably higher than the operating temperature (about 80° C.) of the automatic temperature adjuster 16 there is no fear of reenergizing the timer motor 18 during the ripening step.

Now a miss operation will be discussed. As can be noted from the description of the normal cooking operation described above, after time $t_{a1}$, the contacts $c_1$ and $b_1$ of the microswitch 14 are held closed until reset by the operating member 13a. Assume now that a kettle 5 newly charged with rice and water is disposed in the inner frame 2 and that only the timer 17 is set. Under these conditions, since the temperature of the bottom of the kettle is the same as that of water, the automatic temperature adjuster 16 does not close so that the timer motor does not operate. Consequently, the heater 8 is not energized thus preventing half-boiling.

As above described, according to the second embodiment, by setting a temperature sensitive switch and a timer, twice rice cooking steps including the first and the second or ripening cooking steps are effected automatically. Especially, the time of starting the second cooking step and the interval thereof can be maintained to be always constant and the temperature of the boiled rice during the ripening step is maintained at least more than 98° C. so that more delicious boiled rice can be obtained than the prior art twice cooking type rice cooker operated manually. Even when only the timer is set and connected inadvertently to a source of supply without setting the temperature sensitive switch the auxiliary temperature sensitive switch prevents the heater from being energized. In other words, it is possible to prevent the use of the rice cooker with only the second cooking step.

As above described, the heater is energized twice by a temperature sensitive switch and a timer and the second cooking step is not performed unless the first cooking step is firstly performed thus positively preventing half-boiled rice.

What is claimed is:

1. An electric rice cooker comprising a kettle adapted to contain a quantity of rice and water, a removable lid covering the top of said kettle, an electric aeater for heating said kettle, a temperature sensitive switch disposed to sense temperature of said kettle and having first and second contacts, said temperature sensitive switch energizing said electric heater through said first contact at the time of starting cooking operation, but transferring to said second contact in response to a cooking completion temperature, frame means for supporting and enclosing said kettle and heater, and a timer energized through said second contact for reenergizing said heater for a definite interval a predetermined time after energization of said timer.

2. The electric rice cooker according to claim 1 which further comprises means for preventing reenergization of said heater by said timer prior to the energization of said heater through said first contact.

3. The electric rice cooker according to claim 2 wherein said preventing means comprises a temperature responsive switch which opens and closes in response to a variation in temperature.

4. The electric rice cooker according to claim 3 wherein said temperature responsive switch operates at a temperature lower than said cooking completion temperature.

5. The electric rice cooker according to claim 1, further including insulation between said frame means and kettle.

* * * * *